United States Patent [19]
Winner et al.

[11] Patent Number: 6,115,049
[45] Date of Patent: *Sep. 5, 2000

[54] METHOD AND APPARATUS FOR HIGH PERFORMANCE ANTIALIASING WHICH MINIMIZES PER PIXEL STORAGE AND OBJECT DATA BANDWIDTH

[75] Inventors: Stephanie L. Winner, Santa Clara; Michael W. Kelley, San Mateo, both of Calif.

[73] Assignee: Apple Computer, Inc., Cupertino, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/723,006

[22] Filed: Sep. 30, 1996

[51] Int. Cl.$^7$ .................................................. G06T 11/40
[52] U.S. Cl. .................... 345/432; 345/136; 345/425; 345/422; 345/435; 345/426
[58] Field of Search ..................... 345/432, 425, 345/426, 429, 431, 435, 422, 136

[56] References Cited

U.S. PATENT DOCUMENTS

| | | | |
|---|---|---|---|
| 5,123,085 | 6/1992 | Wells et al. | 345/421 |
| 5,852,443 | 12/1998 | Kenworthy | 345/431 |
| 5,854,631 | 12/1998 | Akeley et al. | 345/419 |

OTHER PUBLICATIONS

Kurt Akeley, "RealityEngine Graphics", Proceedings of SIGGRAPH '93 (Aug. 1993), pp. 109–116.

Carpenter, Loren, "The A–buffer, an Antialiased Hidden Surface Method", ACM Computer Graphics vol. 18, No. 3, Jul. 1984, pp. 103–108.

Haeberli, Paul and Kurt Akeley, "The Accumulation Buffer: Hardware Support for High–Quality Rendering", ACM Computer Graphics vol. 24, No. 4, Aug. 1990, pp. 309–318.

Mammen, Abraham, "Transparency and Antialiasing Algorithms Implemented with the Virtual Pixel Maps Technique", IEEEComputer Graphics & Application, Jul. 1989, pp. 43–55.

*Primary Examiner*—Mark R. Powell
*Assistant Examiner*—Motilewa Good-Johnson
*Attorney, Agent, or Firm*—Sawyer Law Group LLP

[57] ABSTRACT

The present invention is an improved system and method of antialiasing which generates a coverage mask which is retained long enough to achieve geometric precision. The coverage mask information is retained throughout the compositing stage of the image generation. A system for antialiasing an image according to the present invention is comprised of a means for compositing an image, wherein the image is composited using coverage mask data of a pixel, and means for storage of data during image compositing, the storage means coupled to the compositing means.

51 Claims, 16 Drawing Sheets

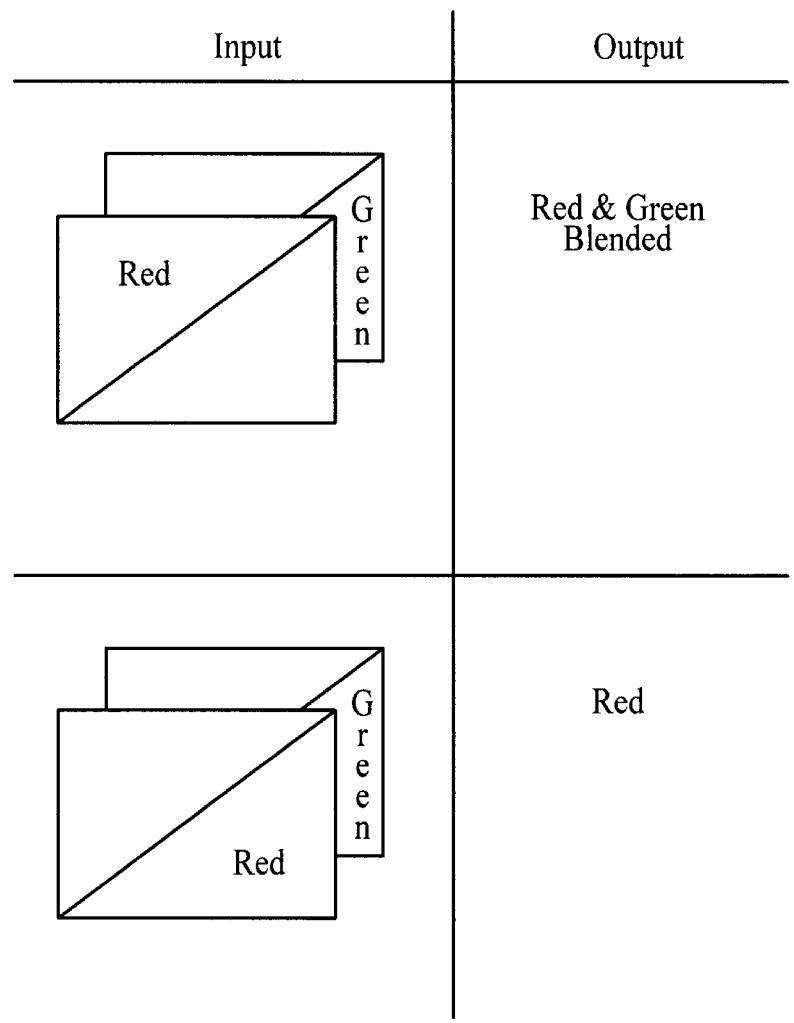

| x,y | z | ∝ rgb |
|---|---|---|
| 0,0 | 5 | |
| 1,0 | 6 | |
| 0,1 | Background | |

0,0,3 ⟶ (pointing to first row)

FIG. 5

| x,y | ∝ rgb | |
|---|---|---|
| 0,0 | green | |
| 1,0 | red | |
| 0,1 | Background | |

0,0 black ⟶ (pointing to first row)

FIG. 6

METHOD AND APPARATUS FOR HIGH PERFORMANCE ANTIALIASING WHICH MINIMIZES PER PIXEL STORAGE AND OBJECT DATA BANDWIDTH

FIELD OF THE INVENTION

The present invention relates generally to the generation of computer graphics, and more particularly, to an improved system and method of antialiasing which generates a coverage mask which is retained long enough to achieve geometric precision.

BACKGROUND OF THE INVENTION

Several high quality rendering algorithms attempt to present a form of realism typically lacking in most computer generated graphics displays. Visual queues that portray depth of field, lighting and optical effects, shadows, material properties, and physical phenomenon, aid tremendously in the overall perception of an image. In rendering computer graphics, geometric shapes can appear jagged, in part, due to the approximation involved in attempting to draw a geometric on a discrete grid of points. A more pleasing geometric shape can be drawn by applying what have come to be known as antialiasing techniques. When pixels located at the edge of a geometric shape are densely covered in a color, the edge appears jagged as shown in FIG. 1A. However, if the pixels located at the edge of the geometric shape are less solidly covered in color, then the edge will appear softer as shown in FIG. 1B.

Traditionally, there are two common methods of antialiasing: supersampling and area sampling. Supersampling is a "brute force" solution. Therefore it is straightforward, but requires vast amounts of data storage. Area sampling based algorithms are more economical, but produce images which are of lower quality than those generated by supersampling.

In supersampling, rather than using a single sample of the data for each pixel, several samples with higher bandwidth are utilized, effectively increasing the resolution of the image. Many point samples are typically taken in the region of each pixel, and these samples are integrated, perhaps with a weighting function, to obtain the final pixel shading. Before the image is output for viewing, a 2D filter is typically applied which properly scales the output image resolution. For example, assume nine samples are used for each output pixel. Nine times as many depth and color samples must be stored in the z buffer and image buffer. Furthermore, nine times as many depth comparisons and blend operations must also be computed. The problem associated with supersampling is the huge amount of memory required and high object data/pixel data bandwidth. Consequently, supersampling can be highly expensive.

To eliminate the memory requirement of conventional supersampling, an accumulation buffer can be used. When accumulation buffers are used, samples are typically scaled before being stored in an image buffer. They are summed during the storing operation. Using the same example used in supersampling, assume nine samples are used for each output pixel. Nine times as many depth and color samples must be taken. Furthermore, nine times as many depth comparisons and blend operations must also be computed. Each incoming data would be multiplied by ⅑ prior to storage and summed with the previously stored data. In effect, this method performs supersampling prior to storage. Supersampling used with an accumulation buffer is typically associated with having a high object data bandwidth and requiring low storage in the image buffer. The problem with this method, however, is that it is expensive to process such a large multiple of the data. Another problem with this method is that the Z buffer also requires nine times the storage to maintain geometric accuracy.

Area sampling describes a class of algorithms which use a sub-pixel resolution mask to control the compositing of the object data. These algorithms are often referred to as A-buffer based. Area sampling algorithms vary in the complexity of hidden surface removal and color blending techniques. More complex hidden surface removal requires more data storage, but results in a higher image quality. More complex color blending requires additional arithmetic functions which can be costly and/or slow.

There are a variety of area sampling processes. One such process assigns an alpha ($\alpha$) value associated with each pixel. The a value is an indication of the transparency of the pixel. For example, if the pixel is half transparent, then the $\alpha$ value would equal 0.5 (or 128 in fixed point 8-bit binary). Each pixel is also assigned a mask value associated with it. The mask value indicates the amount of coverage within the pixel. For instance, if a pixel is only half covered with color, then the mask associated with the pixel will indicate such. Rather than storing the nine values as in supersampling, this method would store an $\alpha$'RGB where $\alpha'=\alpha*$coverage value.

The problem associated with area sampling is that it is typically not accurate. This method works well for one pixel layer, but not with multiple pixel layers. When data is in an image buffer, the mask of the pixel is no longer known, thus causing a loss of geometric precision. In FIG. 2A, the output of the two colors red and green abutting one another should be red plus green blended, while the color red in front of the color green should have an output of the color red, as shown in FIG. 2B. The conventional area sampling methods typically cannot tell the difference between the situation shown in FIG. 2A where the two colors are abutting and the situation shown in FIG. 2B where the two colors are overlapping because the mask and coverage information is typically discarded prior to being stored in the compositing stage.

What is needed an improved method and system of antialiasing which avoids the expensive memory use and bandwidth of supersampling and yet retains geometric precision of the image to be represented. The present invention fills such a need.

The following references provide further background information: Kurt Akeley, "Reality Engine Graphics", Proceeding of SIGGRAPH '93 (August 1993), p. 109–116; Carpenter, Loren, "The A-buffer, an Antialiased Hidden Surface Method", ACM Computer Graphics, Vol. 18, No. 3, July 1984, p. 103–108; Haeberli, Paul and Kurt Akeley, "The Accumulation Buffer: Hardware Support for High-Quality Rendering", ACM Computer Graphics, Vol. 24, No. 4, August 1990, p. 309–318; Mammen, Abraham, "Transparency and Antialiasing Algorithms Implemented with the Virtual Pixel Maps Technique", IEEE Computer Graphics & Application, July 1989, p. 43–55.

SUMMARY OF THE INVENTION

The present invention is an improved system and method of antialiasing which generates a coverage mask which is retained long enough to achieve geometric precision. The coverage mask information is retained throughout the compositing stage of the image generation. In addition to the data typically retained in an antialiasing method utilizing a mask, the method according to the present invention retains additional data, hereinafter referred to as coverage data information, which is stored for each pixel including, but not limited to, the coverage mask, depth gradient, and a flag indicating the opacity of the mask. Additionally, there are status flags which are evaluated for each pixel including whether the depth of one pixel approximates the depth of another pixel, and whether the layer of data being evaluated is a fragment of a pixel, wherein a fragment indicates that the color being evaluated does not substantially completely cover the pixel. This additional data is used to control the blend function of the image layers and hidden surface removal. The present invention provides a more efficient means of antialiasing several geometries such as antialiasing of silhouettes and geometry with shared vertices.

A system for antialiasing an image according to the present invention is comprised of a means for compositing an image, wherein the image is composited using coverage mask data of a pixel, opacity data, and means for storage of data during image compositing, the storage means coupled to the compositing means.

In another aspect of the present invention, a method for antialiasing an image is comprised of the steps of providing a coverage mask of a pixel; providing a depth gradient of the pixel; providing opacity data of the pixel; and compositing the image using the coverage mask, depth gradient and opacity data.

BRIEF DESCRIPTION OF THE DRAWINGS

FIGS. 2A–2B illustrate situations where two colors are abutting and overlapping.

FIG. 5 illustrates some functions of the hidden surface removal.

FIG. 6 illustrates some of the functions of compositing and image buffer.

DETAILED DESCRIPTION OF THE INVENTION

The present invention relates to an improved system and method of antialiasing which generates a coverage mask which is retained long enough to achieve geometric precision. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1A:
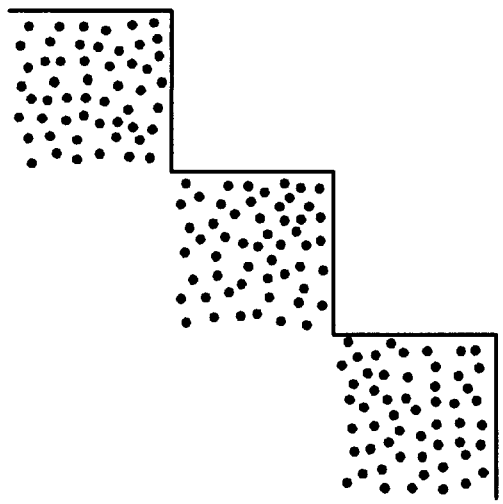
FIGS. 1A–1B illustrate antialiasing an edge of a geometric shape.
Figure 1B:
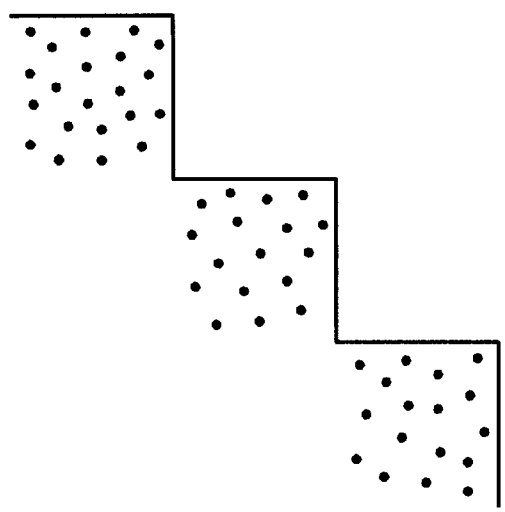
Figure 3:
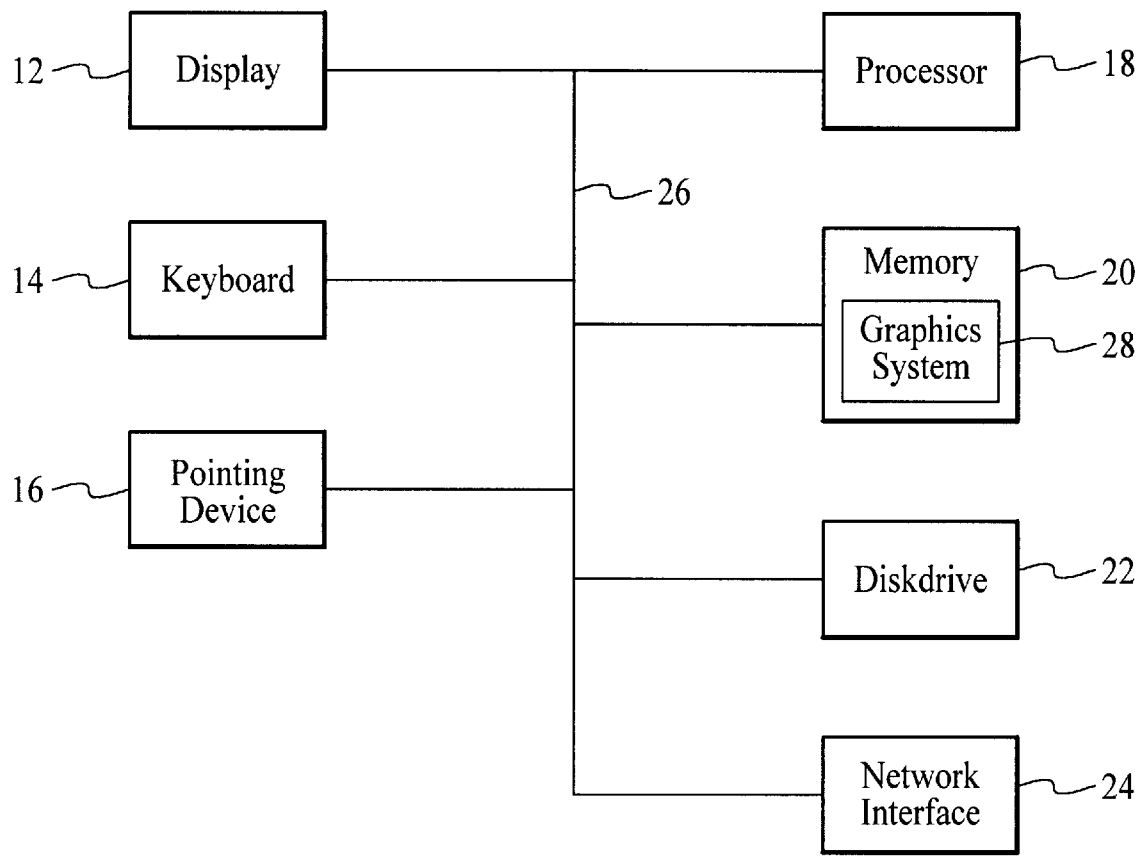
FIG. 3 is a block diagram illustrating a conventional computer system which can facilitate the present invention.

FIG. 3 is a block diagram illustrating a conventional computer system 10, which includes a display 12, a keyboard 14, a pointing device 16, a processor 18, a memory 20, a disk drive 22, and a network interface 24, which are all connected by a bus 26. The processor 18 operates in conjunction with the memory 20 to execute the graphics system 28. In a preferred embodiment, the graphics system may be loaded onto the computer system via the disk drive 22 or a network.

Figure 4:
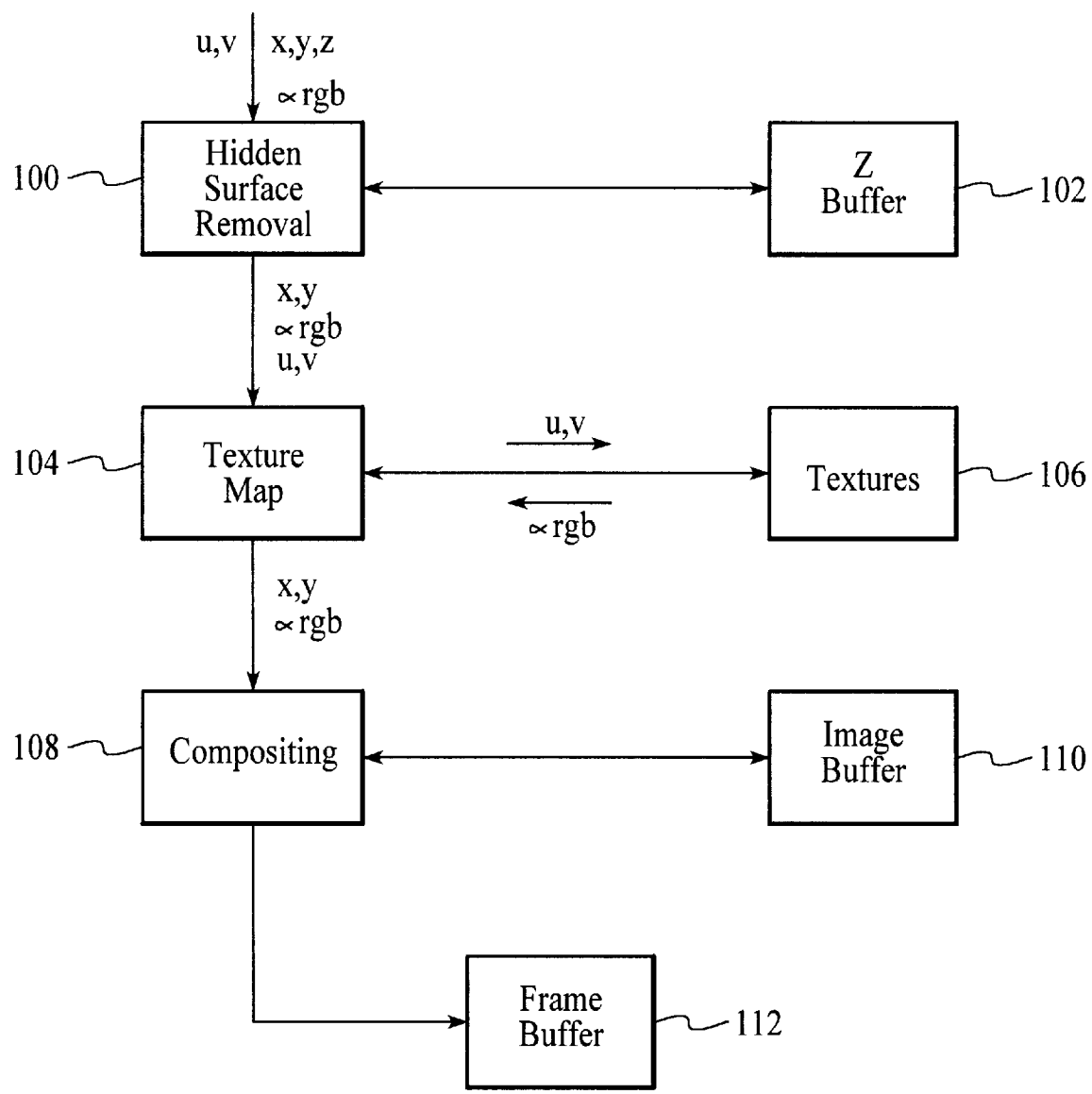
FIG. 4 is a block diagram of a graphics processing system in which antialiasing is typically performed.

FIG. 4 is a block diagram of a graphics processing system in which antialiasing is typically performed. It includes hidden surface removal 100, Z buffer 102, texture mapping 104, textures 106, compositing 108, image buffer 110, and frame buffer 112. In some systems, the image buffer 110 and frame buffer 112 may be combined. The hidden surface removal typically sorts the image geometry, from front to back or back to front. It typically receives information such as the color ($\alpha$ RGB), the depth (z), and the screen position of the pixel (X,Y). Some of the functions of the hidden surface removal is shown in FIG. 5. As new information is processed, it replaces the existing information. For instance, the pixel located at the screen position 0,0 with a depth of 3 may replace a prior pixel information at the screen position 0,0 with the depth of 5. As objects are composited, "background" in the depth (Z) column is replaced with new data. The colors of the pixels are typically referenced in a lookup table via texture map 104 and textures 106 or are input as rgb.

Figure 7A:
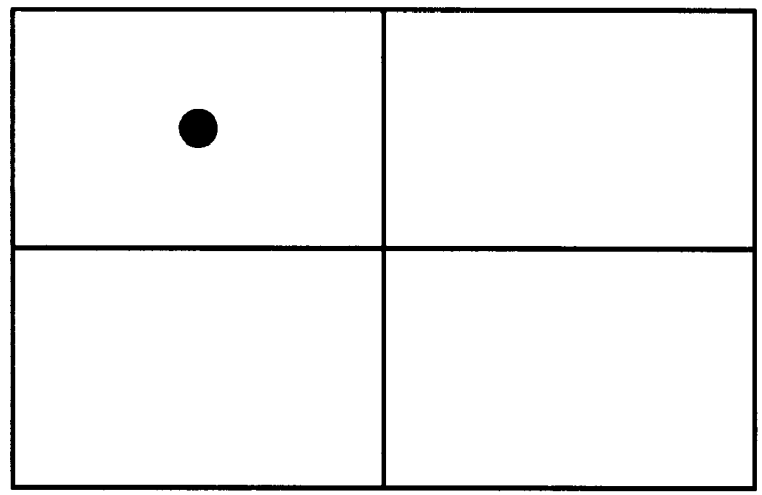
FIGS. 7A–7B illustrate pixels with different masks but same coverage.
Figure 7B:
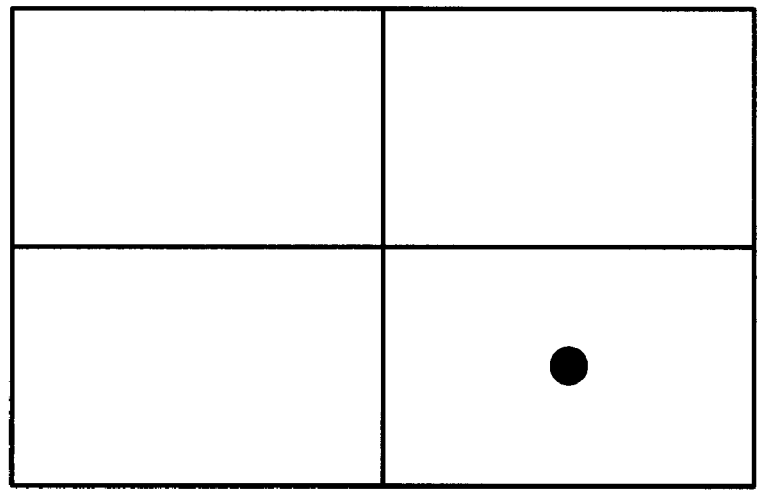

The compositing block 108 works in conjunction with the image buffer 110 to composite images which are visible to the user. FIG. 6 illustrates some of the functions of the compositing block 108 and the image buffer 110. If the foremost object located at position (0,0,3) is opaque, then its color would replace the color of the previous layer. For instance, 0,0,black would replace 0,0,green as shown in FIG. 6, just as (0,0,3) replaced (0,0,5) earlier in FIG. 5. Additionally, in a method using a mask associated with each image layer, the compositing block 108 of FIG. 4 generates $\alpha'$ equal ($\alpha$)×(coverage), where coverage is function of mask. In the pixels shown in FIGS. 7A and 7B, the mask of each pixel are different from each other. However, the coverage of both pixels equals 0.25.

A general problem with the typical methods using masks is that by the time the texture mapping 104 of FIG. 4 is completed, the color of the image has already been scaled and the mask already used and discarded. The coverage is lost since it is typically too expensive to the keep the mask information. Consequently, these conventional methods typically lose geometric precision.

What is needed is an improved method and system of antialiasing which avoids the expensive memory use of supersampling and yet retains geometric precision of the image to be represented. The present invention fills such a need.

The present invention is an improved system and method of antialiasing which generates a coverage mask which is retained long enough to achieve geometric precision. The coverage mask information is retained throughout the compositing stage of the image generation. In addition to the data typically retained in an antialiasing method utilizing a mask, the method according to the present invention retains additional data, hereinafter referred to as coverage data information, which is stored for each pixel, including but not limited to, the coverage mask, depth gradient, and a flag indicating the opacity of the pixel. The depth gradient can optionally be stored in the Z buffer. Additionally, there are status flags which are evaluated for each pixel including whether the depth of one pixel approximates the depth of another pixel, and whether the layer of data being evaluated is a fragment of a pixel, wherein a fragment indicates that the color being evaluated does not substantially completely cover the pixel. This additional data is used to control the blend function of the image layers and hidden surface removal. The present invention provides a more efficient means of antialiasing several geometries such as antialiasing of silhouettes and geometry with shared vertices.

Generally, it is often possible for all the objects in a partition to be composited during a single pass of the data through the rendering pipeline. However, multiple passes are necessary if several objects which are not "close" (i.e., considered equal) in depth contribute to the final pixel color. This can occur when one object is transparent. An overflow is indicated by the composite engine when an object is partially obscured by an object already in the buffer. If there is an overflow during a pass, another pass is generally required to composite the image for at least one pixel in the partition.

There are several different methods for generating the coverage mask. Point sampled algorithms can be used to accurately represent the geometry. Area sampled algorithms can be used to best represent the area which is covered regardless of the specific geometry. The present invention generally produces the best quality images when the masks are point sampled rather than area sampled.

In the present invention, the bits associated with subpixels which are covered by the current geometric object are asserted and the others are negated. Therefore, the mask represents both coverage and area data. The coverage mask data may require eight bits.

Figure 8:
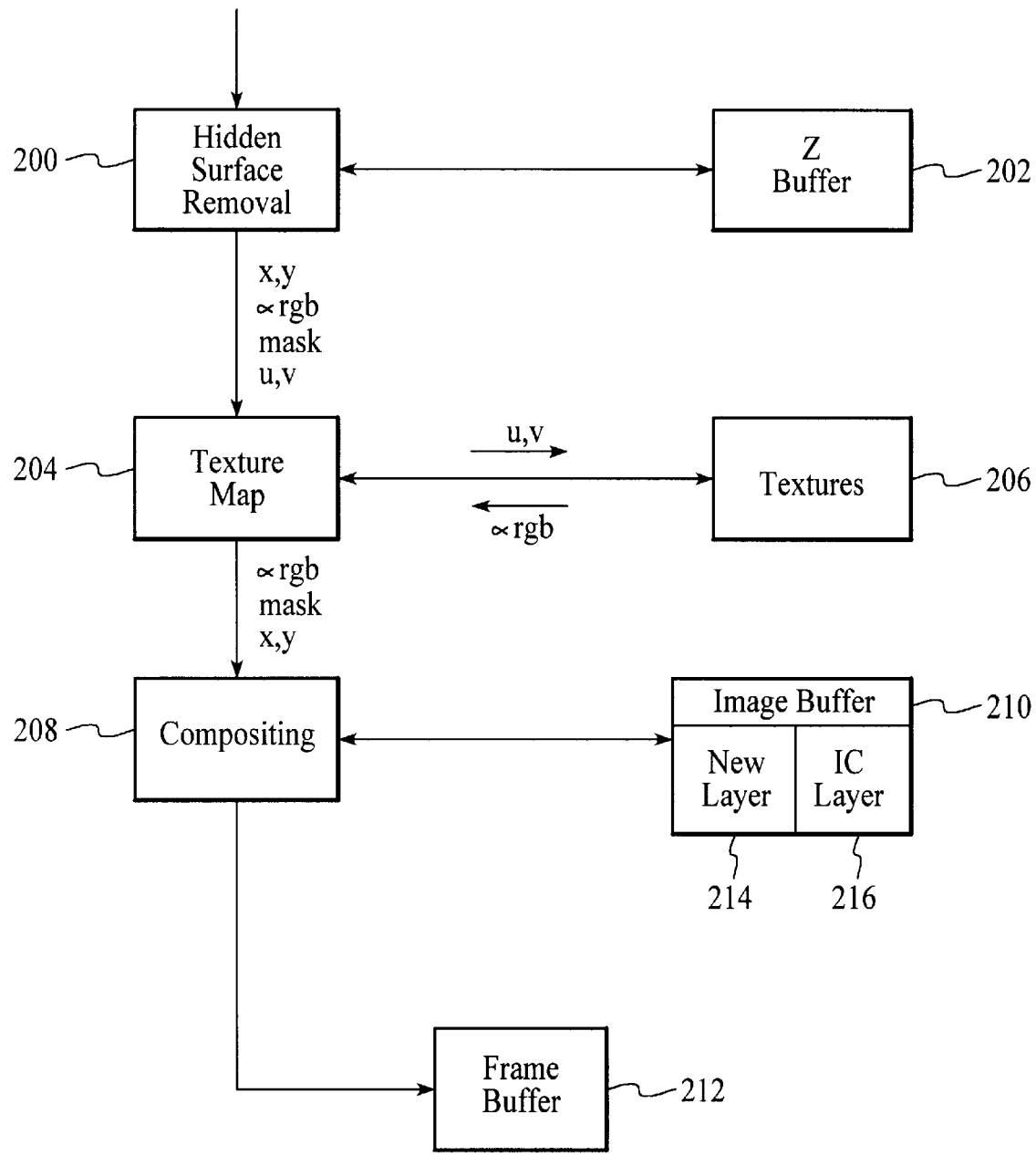
FIG. 8 is a block diagram of an antialiasing system according to the present invention.
Figure 9A:
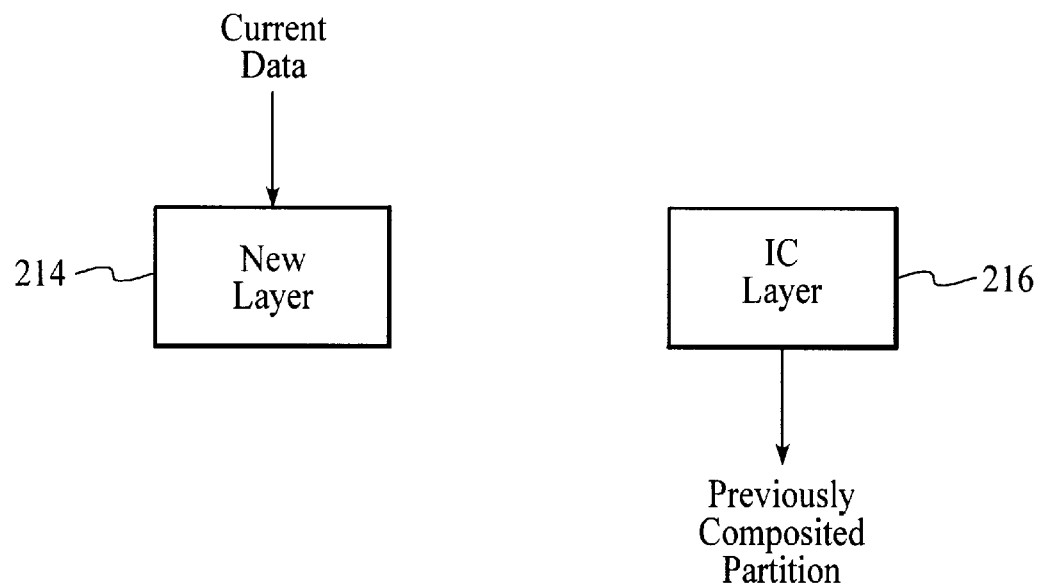
FIGS. 9A–9B are block diagrams of the functions of the dual buffers.

FIG. 8 is a block diagram of an antialiasing system according to the present invention. It includes a hidden surface removal 200, a Z buffer 202, a texture map 204, textures 206, a compositing block 208, an image buffer 210 and a frame buffer 212. The architecture according to the present invention is preferably partition-based to allow the complete screen to be assembled in smaller pieces. A local partition-based buffer is used to composite the image. To improve performance, two buffers, herein referred to as new layer 214 and IC layer 216, can be used. Each of the buffers 214 and 216 can store the pixel data for a partition. One buffer can be used to composite the current partition data while the previously composited partition can be transferred from the other buffer to the system frame buffer 212 as shown in FIG. 9A.

Figure 9B:
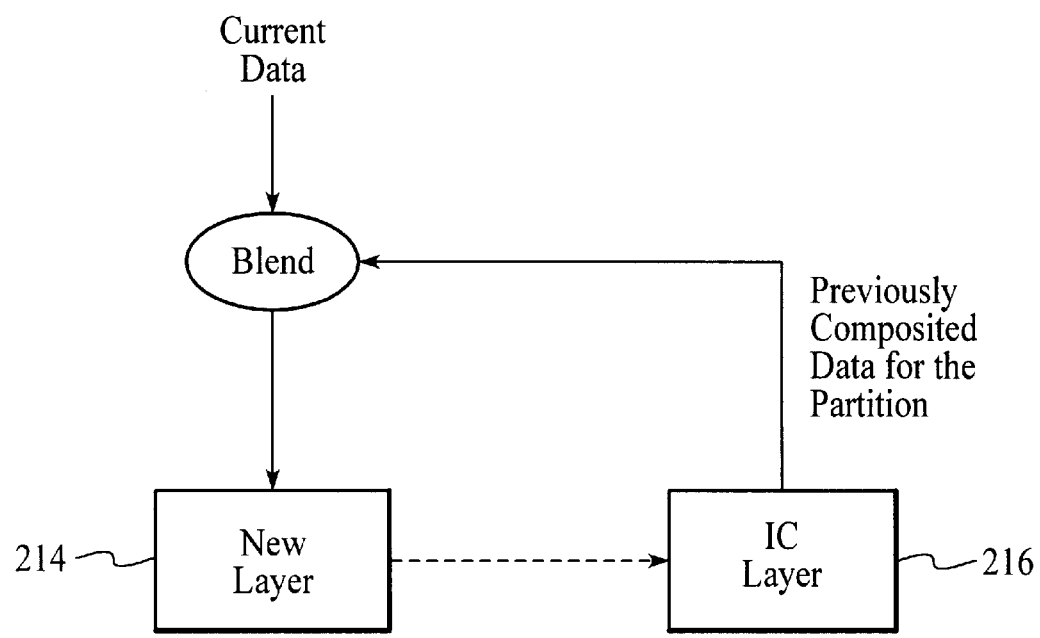

When an overflow occurs, both buffers, new layer 214 and IC layer 216 are needed to composite the partition. One buffer contains the objects composited thus far for the partition which can be referred to as the IC layer 216. The second buffer can be referred to as the new layer 214 which contains the IC layer data composited with any new data which has been received so far for the partition during the current pass as illustrated in FIG. 9B.

Figure 10:
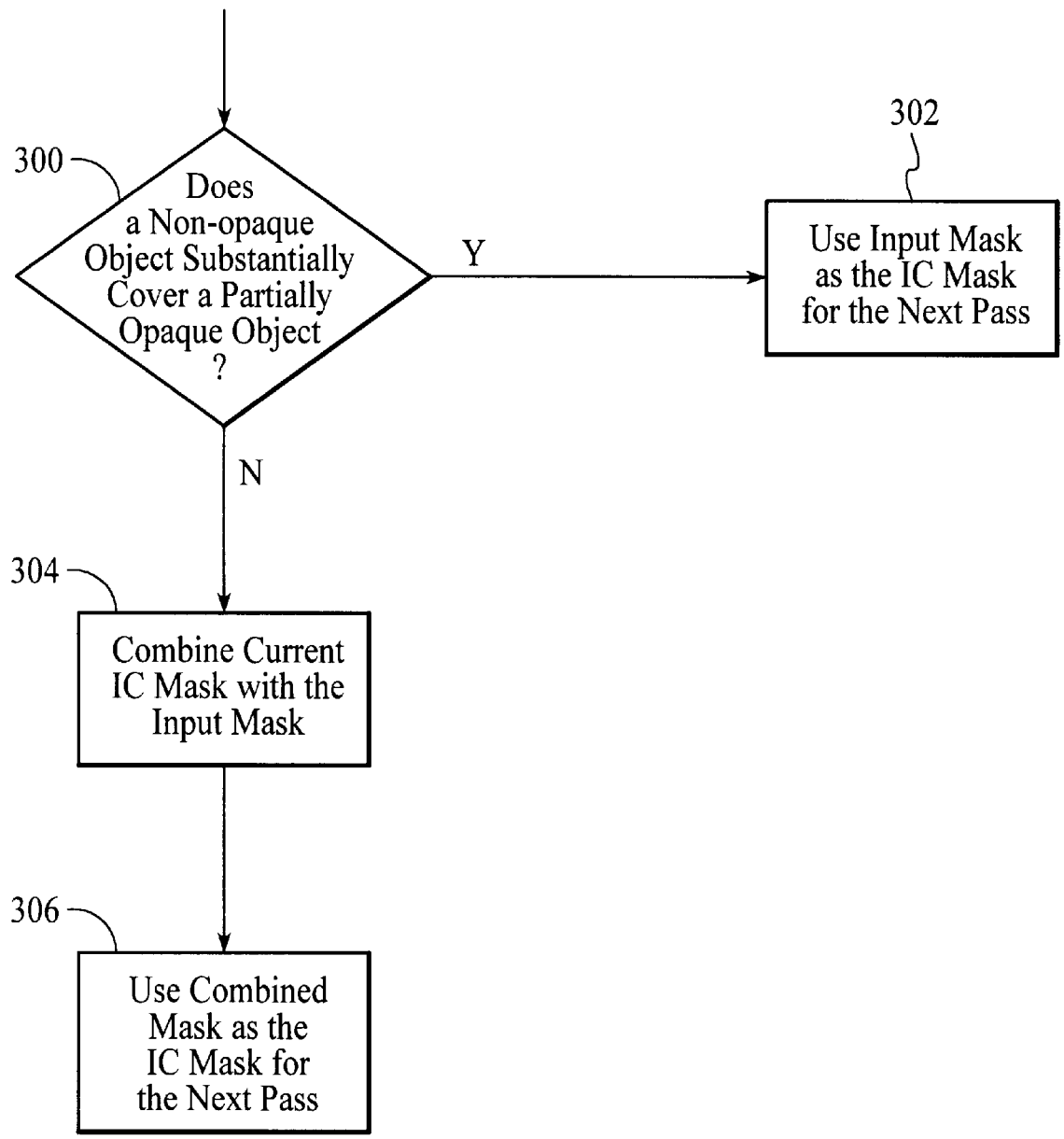
FIG. 10 is a flow diagram of a method of mask generation according to the present invention.

FIG. 10 is a flow diagram of a method of mask generation according to the present invention. It is first determined whether a non-opaque object substantially completely covers a partially opaque object via step 300. If it does, then the input mask is used as the IC mask for the next pass via step 302. However, if a non-opaque object does not substantially completely cover a partially opaque object, then the current IC mask is combined with the input mask via step 304. This combined mask is used as the IC mask for the next pass via step 302. In summary, when a non-opaque object substantially completely covers a partially opaque object, the input mask is used as the IC mask during the next pass. Otherwise, the current IC mask is combined with the input mask to generate the next pass's IC mask.

Figure 11:
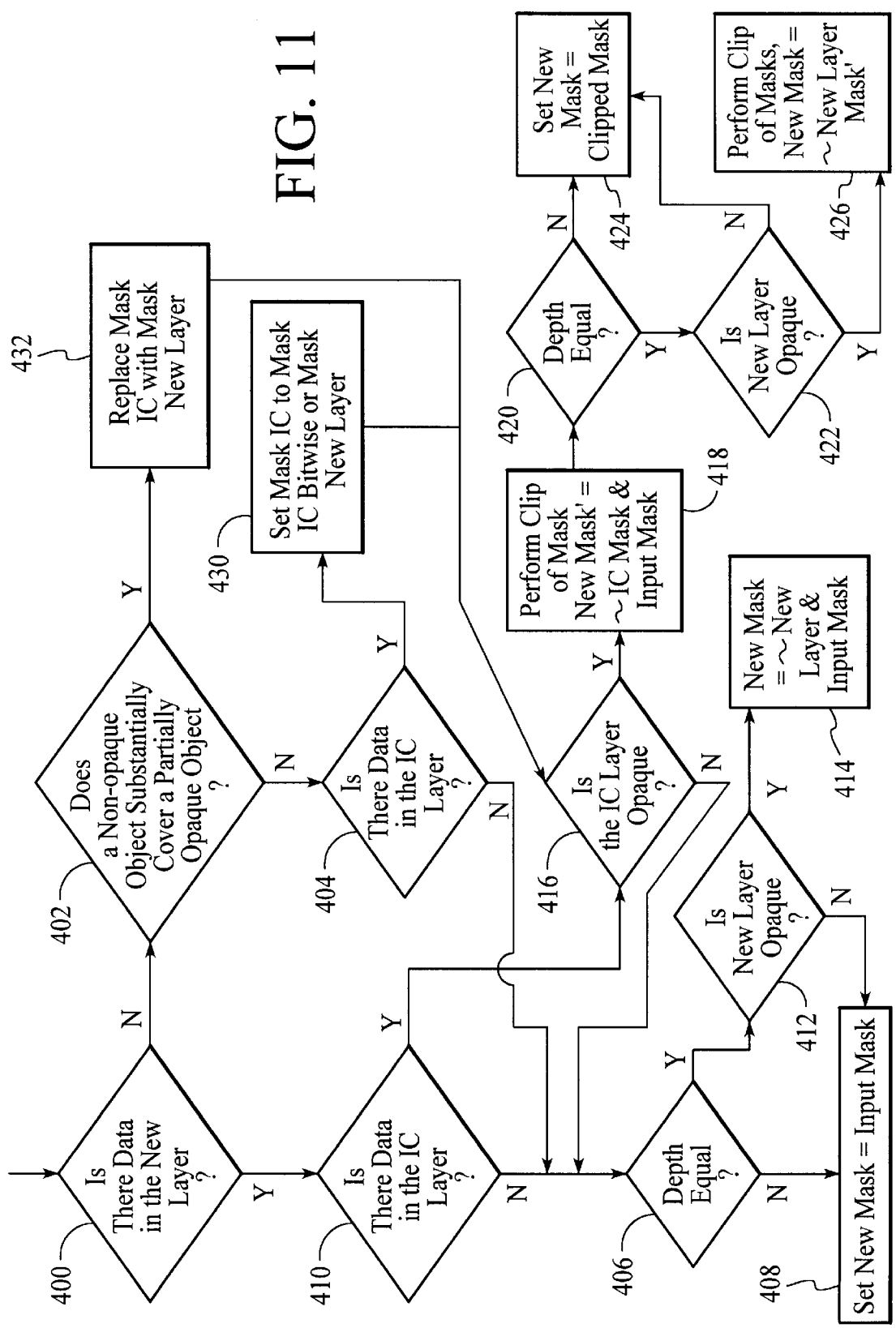
FIG. 11 is a flow diagram of a generation of a mask associated with a pixel according to the present invention.

FIG. 11 is a more detailed flow diagram of the generation of a mask associated with a pixel according to the present invention. First, it is determined whether there is any data related to this pixel in the new layer via step 400. Assuming there is no data in the new layer, it is next determined whether a non-opaque object substantially completely covers a partially opaque object via step 402. An example of a non-opaque object substantially completely covering a partially opaque object is a view through a stained glass window (non-opaque) of a silhouette of a chair.

If a non-opaque object does not substantially completely cover a partially opaque object, then it is determined if there is any data in the IC layer via step 404. In the example given above, the stained glass would be the IC layer. There is data in the IC layer when multiple passes are used. There is no data in the IC layer for the first pass of a partition and there is data in the IC layer for all subsequent passes of that partition. Multiple passes are necessary to resolve the image when an overflow has occurred for at least one pixel in the partition. When there is an overflow, the IC layer data is used in the compositing operation. Otherwise, the IC layer contains data for the previous partition and is typically being scanned out to the image buffer in parallel with the compositing of the current partition.

If there is no overflow, then it is determined if the depth of the input and new layers are equal via step 406. Depths will be set to be equal only if the pixel is a fragment. A fragment is a situation where the pixel's mask does not substantially completely cover the pixel. There can be several triangles covering a pixel which shares a common vertex where each may have a depth which approximates the depth of another triangle fragment within the pixel. The first triangle fragment within a pixel to be evaluated will be considered to not have an equal depth. Thereafter, the remaining triangles in the pixel will have their depths evaluated via step 406. Assuming this is the first triangle being evaluated within a pixel, the new mask will be set to the input mask via step 408. When the new mask is set to equal the input mask, the mask of the pixel or the fragment thereof which has just been evaluated will be the mask which is used to calculate the coverage.

As the next layer of data is evaluated, it is determined whether there is any data regarding the pixel in the new layer via step 400. If there is, then it is determined whether there is any data in the IC layer via step 410. Assuming there is no data in the IC layer for this particular pixel, it is determined whether the input's depth is equal to the other layer which has come before it and saved as the new layer via step 406. If the depth is not equal, then the new mask is simply set to equal the input mask via step 408.

As the next layer of data is being processed, it will be determined that there is data in the new layer via step 400 due to the other data which has come before it. Assuming there is still data in the IC layer via step 410, it will be determined whether the depth is equal via step 406. Assume that the depth is equal and that this fragment has a depth very close to the fragment which came before it. Note that it is irrelevant to the determination whether this fragment is part of the same object which was described by the previous data.

If the depth is considered equal, it will be determined whether the new layer is opaque via step 412. If the new layer is opaque, then the opaque triangle could visually obscure portions of the other triangle fragment. When the new layer is opaque, the new mask is set equal to the inversion of the new layer and a bitwise and with the input mask. (New mask=~new layer & input mask) via step 414. This new mask will be used to modify the input α RGB.

Assuming that new data is being processed, it will be determined that there is data in the new layer via step 400. Assume that there is data in the IC layer via step 410, then it will be determined whether the IC layer is opaque via step 416. If the IC layer is not opaque, then it will be determined whether the input depth is equal to new layer depth via step 406. If the depth is equal, it will be determined if a new layer is opaque via step 412. If not, the input mask will be utilized via step 408.

Assume that new data is being evaluated, there is data in the new layer in step 400, there is data in the IC layer in step 410, and the IC layer is opaque in step 416. In this instance, the mask of the IC layer will clip the input mask via step 418. The clip of the mask is performed by setting new mask'=~IC mask & input mask.

It is then determined if the depths are equal via step 420. If the depths are not equal, then the clipped mask is used as the newmask via step 424. However, if the depths are equal, then it is determined whether the new layer is opaque via step 422. If it is not opaque, then the clipped mask is used as the newmask via step 424. However, if the new layer is opaque, then another clip of the mask is performed via step 426 where the IC mask clips the input mask. The clip is performed by setting new mask=~new layer & new mask'. The latest clipped mask is then used as the newmask.

Assume that new data is being evaluated, there is no layer in the new layer in step 400, a non-opaque object does not substantially completely cover a partially opaque object in step 402, and there is data in the IC layer in step 404, then mask IC is set to mask IC bitwise OR mask new layer via step 430. At the end of each pass, the final mask must be calculated by merging the IC mask with the new layer mask as performed in step 430. However, instead of actually merging at the end of the pass, the merge is preferably performed the first time a pixel is evaluated during the next pass, i.e., when it is determined there is no data regarding this pixel in the new layer via step 400. This delaying of the merging of the masks allows the retention of the individual mask information to facilitate proper compositing of the fragment into the image. Step 402, where it is determined whether a non-opaque object substantially completely covers a partially opaque object, determines how the masks are merged. If it is determined that a non-opaque object does substantially completely cover a partially opaque object via step 402, then it will also determine that the IC layer is opaque via step 416, thus determining how the masks are merged.

If it is determined that there is no data regarding this pixel in the new layer via step 400, and that a non-opaque object substantially completely covers a partially opaque object via step 402, then the IC mask is replaced with the new layer mask via step 432. It is then determined if the IC layer is opaque via step 416, and continuing as previously discussed. Once a new mask is calculated, situations such as silhouettes and shared vertices can be evaluated.

Figure 12:
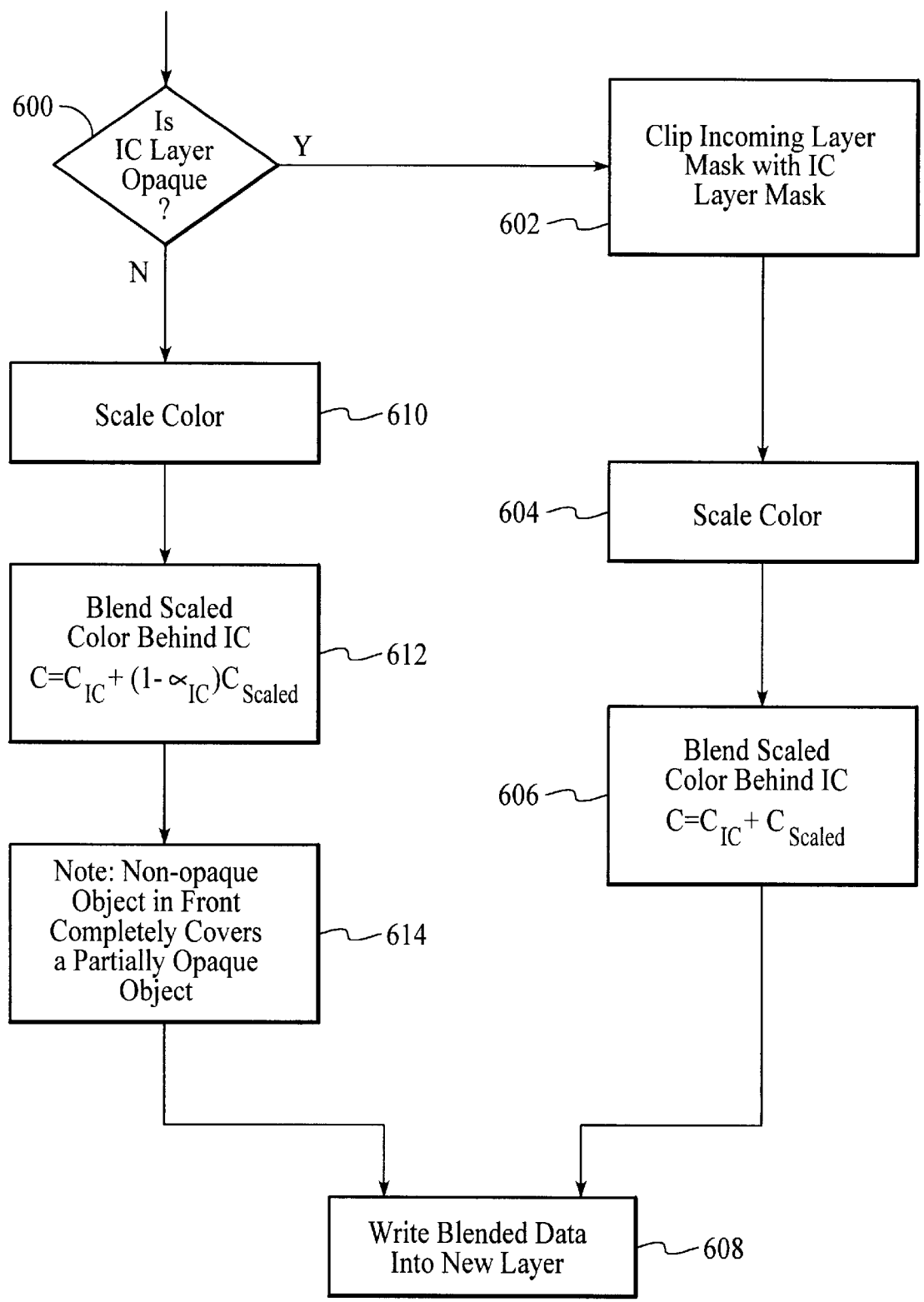
FIG. 12 is a flow diagram of a method of evaluating a silhouette behind a non-opaque IC layer according to the present invention.
Figure 13:
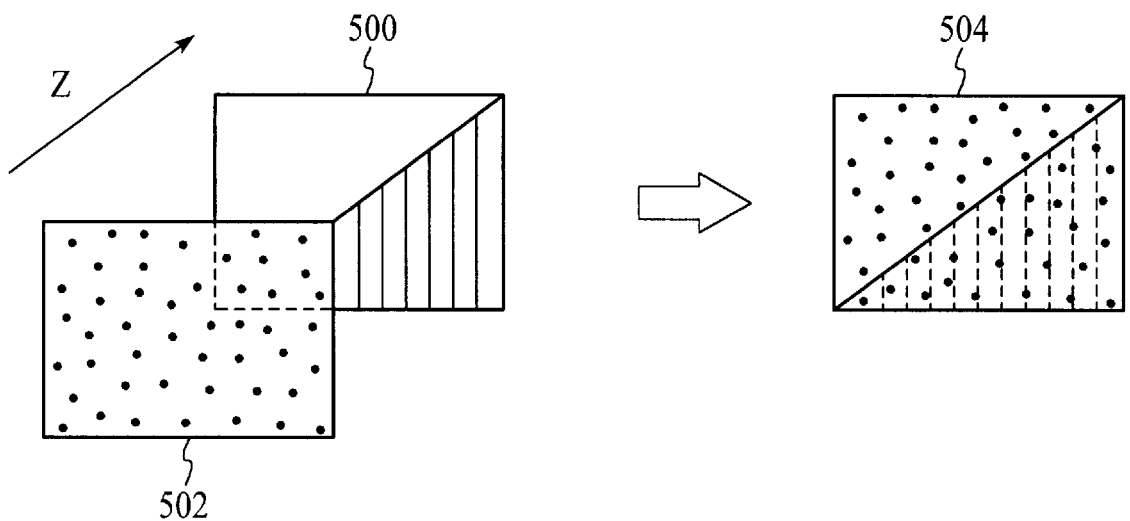
FIG. 13 illustrates an example of a silhouette behind a non-opaque layer.

FIG. 12 is a flow diagram of a method of evaluating a silhouette behind a non-opaque IC layer according to the present invention. An example of a silhouette behind a non-opaque layer is shown in FIG. 13. A layer 500 which is partially opaque is shown to be situated behind a layer 502 which is non-opaque. When combined, it may appear to be blended as in the blended layer 504. In the layer 504, the partially opaque layer 500 can be seen to be softened by the non-opaque layer 502.

Several different blend functions can be used to calculate the antialiased color for a pixel. The simplest case is an unobscured silhouette. A silhouette pixel preferably has a coverage mask value which is less than 0×ff. Because it is unobscured, its mask is not affected by the mask of an object in front of it. To properly antialias this silhouette, its color is simply scaled by its coverage area and written into an image buffer.

During the first pass, the incoming pixel data is written into the new layer buffer while the previous partition's pixel data (IC layer) is scanned out to the frame buffer. At the conclusion of the scanout or composite (whichever takes longer) the buffers are swapped and a new partition is composited during the scanout of the just composited partition.

When there is an overflow and it is necessary to composite the image in multiple passes, the image buffer configuration is modified. All the remaining passes after the first pass are as shown in FIG. 9B. The data from the previous pass is blended with the new pixel data and written back into the new layer. The first time a pixel is accessed during a pass, the data is transferred from the new layer to the IC layer so that it will not be overwritten with the blended data. This is necessary because the final data which is received during a pass is the "frontmost" data which obscures any data which was received earlier in the same pass. Therefore, each new pixel data needs to be blended with the pixel data from the previous pass, not all of the data received during the pass. At the end of the pass, the composited data is once again in the new layer buffer.

If there is a subsequent overflow, another pass is initiated and buffers are not swapped. If there was not an overflow, the partition is complete, so the buffers are swapped and the partition is scanned out while the next partition is composited using the configuration shown in FIG. 9A.

The antialiasing of an obscured silhouette is slightly more complex. If the pixel in front (IC layer) has an opaque mask, the obscured pixel's mask is clipped by the front pixel's mask. The obscured pixel's color is scaled by the clipped coverage area and blended with the IC layer color before being written into the new layer image buffer. The additive blend function is used in this case.

$$C_{new} = C_{IClayer} + C_{in\_scaled}$$

where C is color, new is the new layer image buffer, and in_scaled is the input color scaled by the clipped coverage area.

When the IC layer's mask is not opaque, the obscured pixel's mask is not clipped. The input color is scaled by the input mask and blended with the IC layer color using the front-over-back blend function:

$$C_{new} = C_{IClayer} + (1 - \alpha_{IClayer}) C_{in\_scaled}$$

A pixel's mask is considered to be opaque when its alpha is 0xff. It is also considered to be opaque when alpha is greater than the area coverage indicated by the mask. For example, an alpha which is fifty percent transparent is 0x80. An associated mask which had less than four bits asserted would be considered opaque.

Just as there are methods for compositing the colors, there are also methods for compositing the masks. The determination of whether a non-opaque object substantially completely covers a partially opaque object is used to control the mask composite operation. When a non-opaque object does not substantially completely cover a partially opaque object, the masks are composited by ORing the IC layer mask with the input pixel's mask. The non-opaque object is considered to substantially completely cover a partially opaque object when an input pixel's mask is substantially completely covered by the IC layer's mask, the IC layer is not opaque, and the input pixel's alpha is 0xff or is greater than the IC layer's alpha. When it is asserted that a non-opaque object substantially completely covers a partially opaque object, the input pixel's mask replaces the existing IC layer mask. In subsequent passes, the IC layer mask is composited with the input pixel's mask by ORing them together. The determination that a non-opaque object substantially completely covers a partially opaque object affects the color compositing because the IC layer pixel's mask is considered to be opaque when it is asserted. Therefore, the IC layer's mask clips the masks of pixels it obscures and additive blending is used.

It is possible to accumulate a mask of 0xff when a non-opaque object substantially completely covers a partially opaque object and have an alpha of less than 0xff. This situation is treated such that when the IC layer's alpha is less than 0xff and its mask is 0xff, then the fact that a non-opaque object substantially completely covers a partially opaque object is ignored.

When both objects are fragments, i.e. the masks are <0xff, then the depth gradient can be used by the hidden surface removal circuitry to determine the state of whether the depths of two layers is substantially equal. To minimize the depth comparison circuitry and memory requirements, the gradient should be represented by the fewest possible bits, such as 6 bits. The gradient calculation is:

$$\nabla^z = \max(a_z, b_z)$$

where $\nabla^z$ is the depth gradient of the incoming pixel data, and $a_z$, $b_z$ are the floating point constants from the depth plane equation associated with the incoming pixel data, where depth=$a_z X + b_z Y + c_z$. Rather than using the entire floating point representation for $\nabla^z$, the 8 bit exponent is preferably converted to 6 bits (gradient depth). This conversion would simplify the calculation of whether the depth is equal and would reduce the storage requirements. It would also be possible to used a fixed gradient and save storage, but have less geometric accuracy.

A depth$_{min}$ and depth$_{max}$ can be utilized when calculating whether the depths of two layers is substantially equal. Depth$_{min}$ is depth$_{input}$-gradient depth. Depth$_{max}$ is depth$_{input}$+gradient depth. The incoming depth, depth$_{input}$, can be considered equal to depth$_{original}$ (from memory) when depth$_{min}$ is less than or equal to depth$_{original}$ which in turn is less than or equal to depth$_{max}$. When the depths are equal but one pixel data is front facing (facing the viewer) and the other is not, then the front facing pixel data is considered to be closer and the non-front facing pixel data is discarded.

In summary, the depth will be asserted as substantially equal when triangles composing a larger object share a vertex which falls within a pixel boundary. It will also be asserted when triangles which compose different objects abut and the boundary between them falls within a pixel boundary. The information regarding whether the depths are equal and the mask data is preferably passed from the hidden surface removal circuitry and used by the blending circuitry which performs the antialiasing.

FIG. 12 is a flow diagram of a method of evaluating a silhouette behind a non-opaque IC layer according to the present invention. The first block of FIG. 12 determines whether the IC layer is opaque via step 600. One way to determine if the IC layer is opaque for a pixel is to save a bit indicating that the layer is opaque. An alternative method, typically less expensive, is to count the bits in the mask if α is less than 1.0 and mask is less than full, round off the number of bits in the mask, round up the α, divide by a common denominator, and compare them. If α>mask coverage, than the layer is opaque. If the IC layer is opaque, then the incoming layer mask is clipped with the IC layer mask via step 602. Performing a clip is to perform a bitwise AND (input mask & tilda IC layer mask).

Next, the color of the input is scaled by the clipped mask coverage via step 604. The color can be scaled by calculating coverage by counting the number of bits which are set in the clipped mask and multiplying by the input αRGB. This scaled color is blended with the contents of IC via step 606. The compositing-blending function can be applied through the formula:

$$C = C_{IC} + C_{scaled}$$

where C is α, R, G, or B.

Finally, the blended color and clipped mask produced by step 606 can be written into the new layer via step 608. Note that the contents originally in the IC remain in the IC layer for possible use in case there is a layer that needs to be evaluated which is located between the two layers which have already been evaluated.

If the IC layer is not opaque via step 600, then the color is scaled via step 610. Then, the scaled color is blended behind the IC layer via step 612. Here, the α of the IC layer is used to scale the color of the new object.

$$C = C_{IC} + (1 - \alpha_{IC}) C_{scaled}$$

Next, it is noted that a non-opaque object in front substantially completely covers a partially opaque object via step 614. Finally, the blended data is written into the new layer via step 608.

Figure 14A:
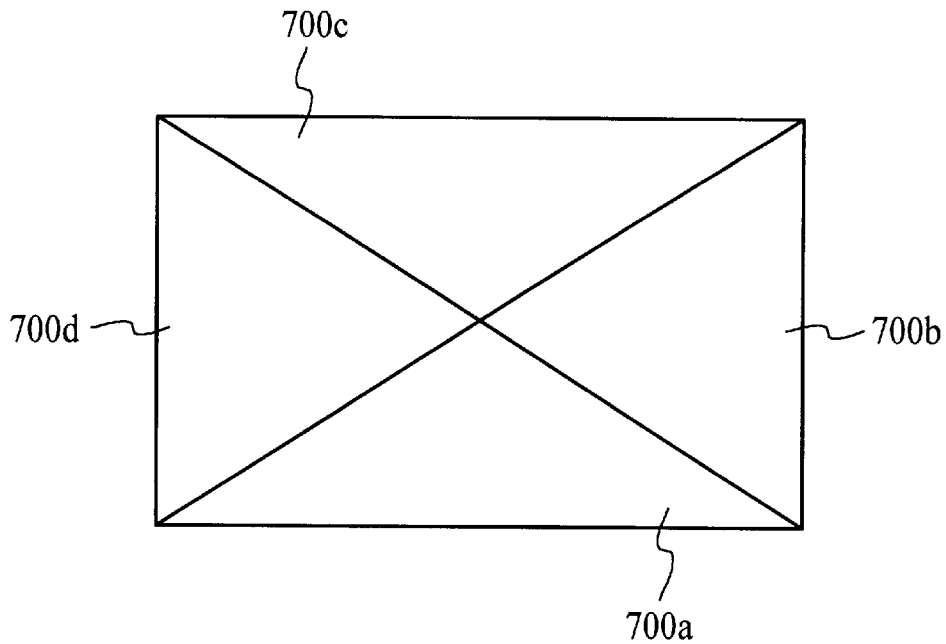
FIG. 14A–14B illustrate examples of shared vertex.
Figure 14B:
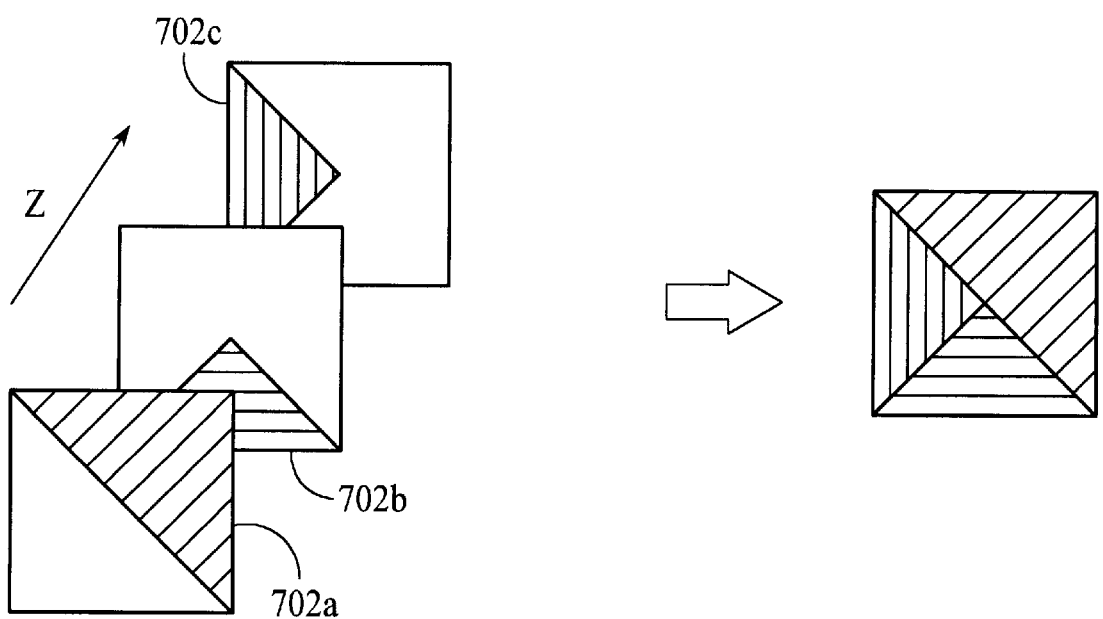
Figure 15:
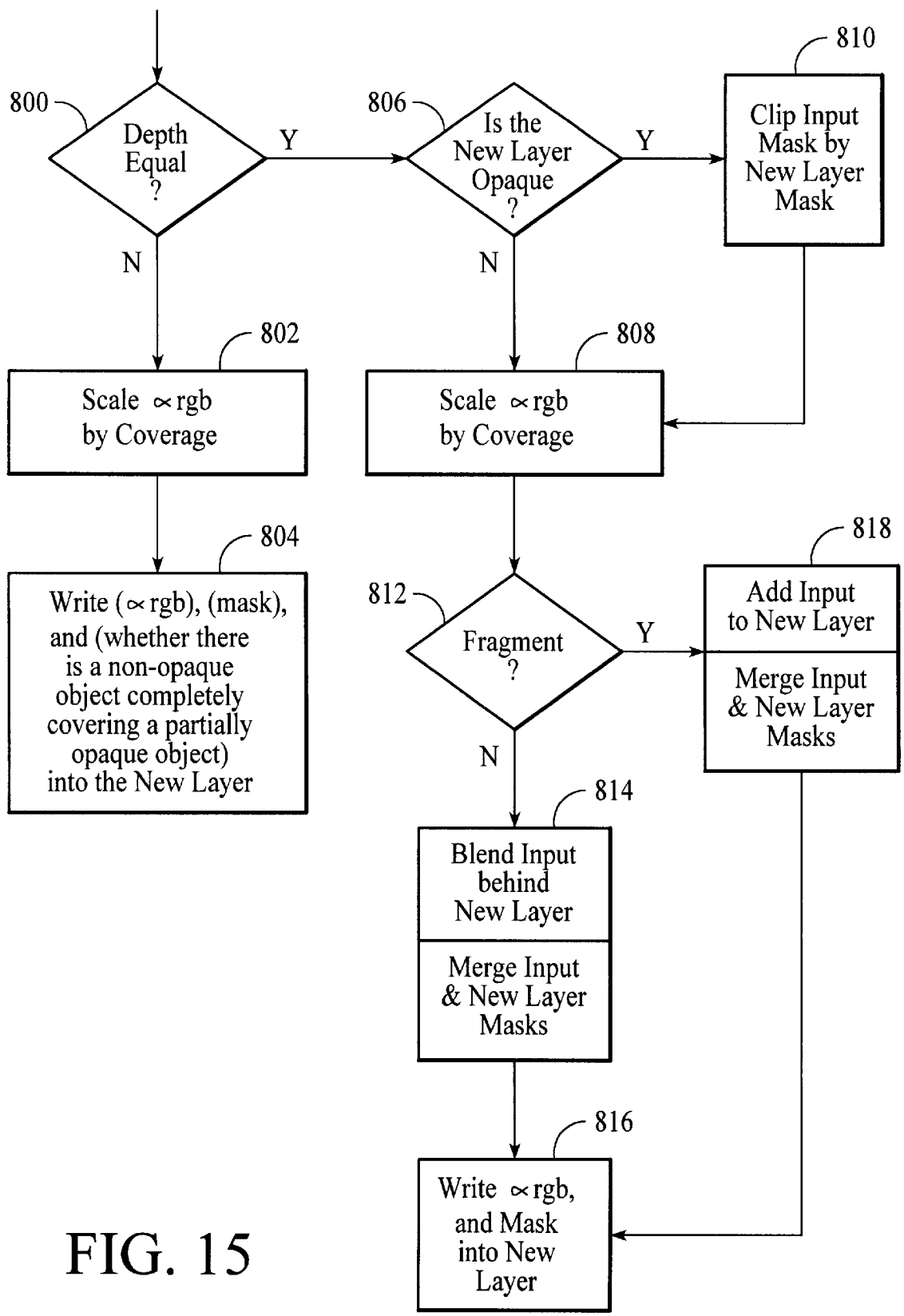
FIG. 15 is a flow diagram of evaluating a situation where there is a shared vertex.

FIGS. 14 A–B and FIG. 15 illustrate a method of shared vertex antialiasing according to the present invention. There are typically two shared vertex cases. One case occurs when the triangles composing a larger object share a vertex which fall within a pixel boundary as shown in FIG. 14A. In FIG. 14A, each of the four fragments 700A–700D are part of a single larger object.

A second case is where triangles which compose different objects abut and the boundary between them falls within a pixel boundary as shown in FIG. 14B. Because the triangles abut, the vertices would be considered equal. FIG. 14B may be a case where fragments 702A–702C are not all part of a single larger object.

Both cases are handled using fragment coalescing with the common element being that the fragments have equal depth values. Because the depths are equal, these fragments are composited in a single pass.

The method for coalescing fragments is different than that of compositing a single fragment (silhouette). Depth is not considered equal for the first fragment 702A so it is treated as a silhouette. When the second fragment 702B is received, its mask is clipped by the mask of 702A if 702A is opaque. It is considered to be opaque when either its α is full or its α value is greater than the coverage indicated by its mask/α. 702B is then scaled by its coverage and blended with 702A. The masks are combined (ORed together) and written into the new layer buffer.

Fragments are coalesced in the compositing circuitry by using the determination of whether the input pixel is substantially equal in depth with the new layer pixel. When the two depths are equal, the input pixel is combined with the new layer pixel, instead of overwriting it. In previous architectures, the equal layers were composited in multiple passes, so processing them in a single pass is a significant performance enhancement.

If the input pixel is obstructed, i.e. there is an IC layer pixel, the input pixel's mask is first clipped by the IC layer mask if either the IC layer is opaque, or if a non-opaque object substantially completely cover a partially opaque object during a previous pass. After being clipped by the IC layer mask, the input mask is clipped again by the new layer mask if that mask is considered to be opaque. The new layer alpha is preferably the blended alpha of the IC layer and the equal pixels received during the current pass. The IC layer alpha is preferably the blended alpha from the previous passes. It would be possible to reconstruct the alpha of the equal pixels using those alphas, but it is sufficient to use the new layer alpha.

As in silhouette antialiasing, the input pixel color is scaled by its clipped coverage mask. However, the blending operations for shared vertex antialiasing are different than those for silhouettes. When an equal pixel has a clipped mask which is not 0xff, then it is considered a fragment. The determination of whether a layer is a fragment is used to control the blending operation. If the pixel is a fragment which is obscured by a pixel which has an opaque mask (opaque IC), the clipped pixel color is added to the new layer pixel's color. As previously discussed, the new layer color will contain the IC layer blended with the first equal layer. Depth is not considered equal when the first equal layer is received, so it is blended with the IC layer and written into the new layer. Therefore, it is not necessary to blend the new layer with the IC layer when pixels with equal depth are received.

When there is no opaque IC, then the front-over-back blend function is used with the determination of whether a layer is a fragment selecting the front alpha. When a layer is considered a fragment, the IC layer alpha is used, otherwise, the new layer alpha is used. In effect when the pixel is a fragment, it is blended behind the IC layer pixel, but not behind the equal layer pixels. If it is not a fragment, it is blended behind the IC layer and the equal layer pixels.

When the equal pixel is not obscured by the IC layer, the determination of whether a pixel is a fragment is also used to control the blending operation. When a pixel is a fragment, additive blending is used. Otherwise, front-over-back blending is used with the new layer alpha as the front alpha. In this case new layer alpha is all of the previously equal pixels received during the current pass.

When the depths of the two layers are equal, the mask is composited by ORing the clipped input pixel mask with the new layer mask.

The blending function for the first object received during a pass is:

Non-opaque IC: $C_n = C_{IC} + (1 - \alpha_{IC})C_{in}$

Opaque IC: $C = C_{IC} + C_{in}\text{-scaled}$ where n is the number of passes. Because the compositing mode is front-to-back during multiple pass compositing according to the present invention, each new object is scaled by $(1-\alpha)$ where α is the combined α of all layers before it.

When a subsequent object is received which has an equal depth, is a fragment, and the data in the IC is opaque, then the following blend function is used:

$$C_{new\ layer} = C_{new\ layer} + C_{in}$$

When the input layer is a fragment and the IC layer is not opaque, the blend function uses the IC layer α such that:

$$C_{new\ layer} = C_{new\ layer} + (1 - \alpha_{IC\ layer})C_{in}$$

FIG. 15 is a flow diagram of evaluating a situation where there is a shared vertex and no IC layer. First it is determined whether the depth is equal via step 800. If the depth is not equal, then the color is scaled by scaling the α RGB by the coverage via step 802. Then the scaled α RGB, the input mask, and information regarding whether there is a non-opaque object substantially completely covering a partially opaque object is written into the new layer via step 804.

If the depth is equal via step 800, then it is determined whether the new layer is opaque via step 806. If the new layer is not opaque, then the color is scaled by the coverage via step 808. If the new layer is opaque, then the input mask is clipped by the new layer mask via step 810 prior to scaling the color via step 808. Once the color has been scaled in step 808, then it is determined whether this input layer is a fragment via step 812. If it is not a fragment, then the input layer is blended behind the new layer and the input and new layer masks are merged via step 814. Thereafter, the α RGB and the mask are written into the new layer via step 816. If it is determined that the input layer is a fragment via step 812, then the input data is added to the new layer and input and new layer mask are merged via step 818. Thereafter, α RGB and the mask are written into the new layer via step 816.

Figure 16:
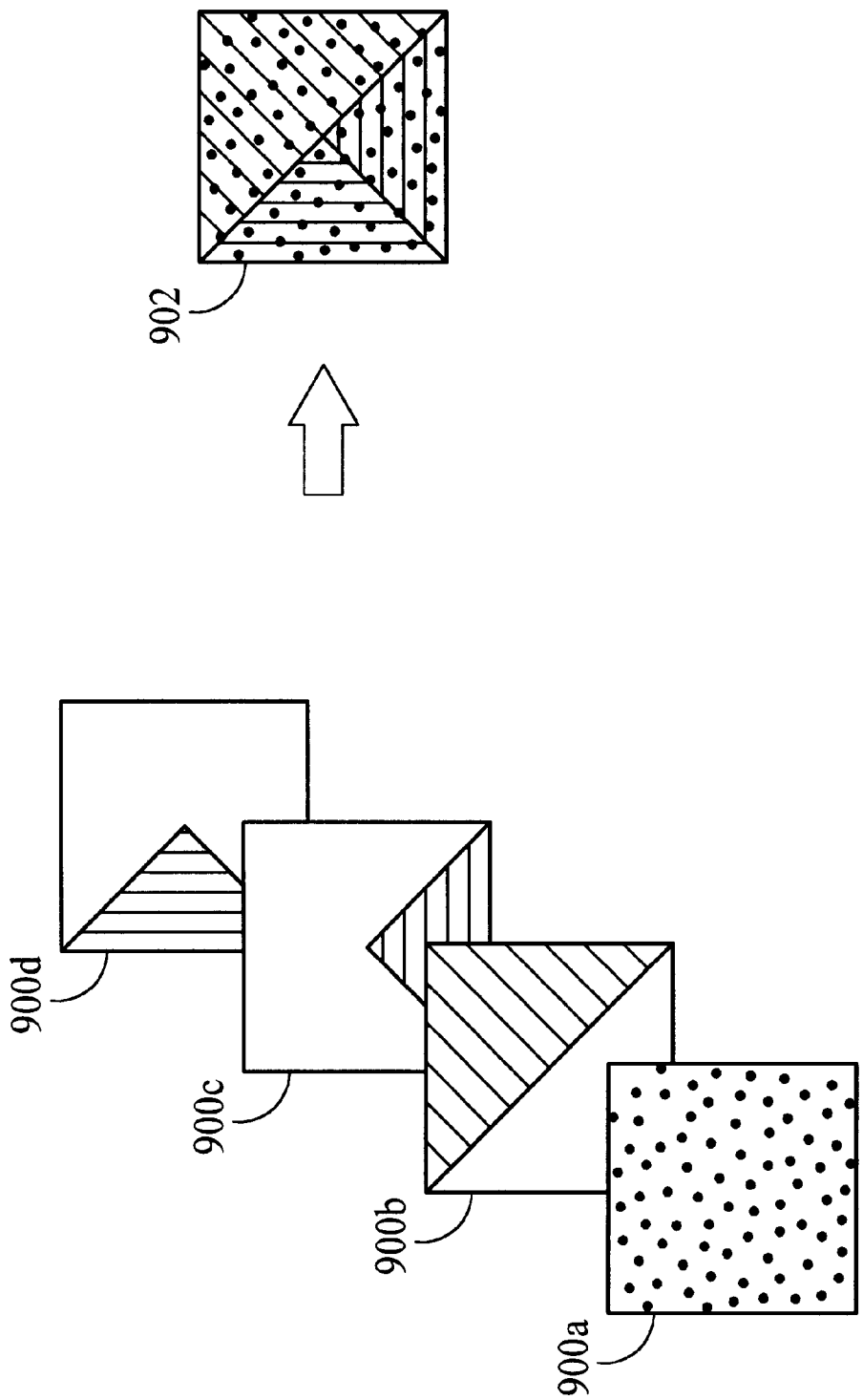
FIG. 16 illustrates a non-opaque layer in front of various partially opaque layers.
Figure 17:
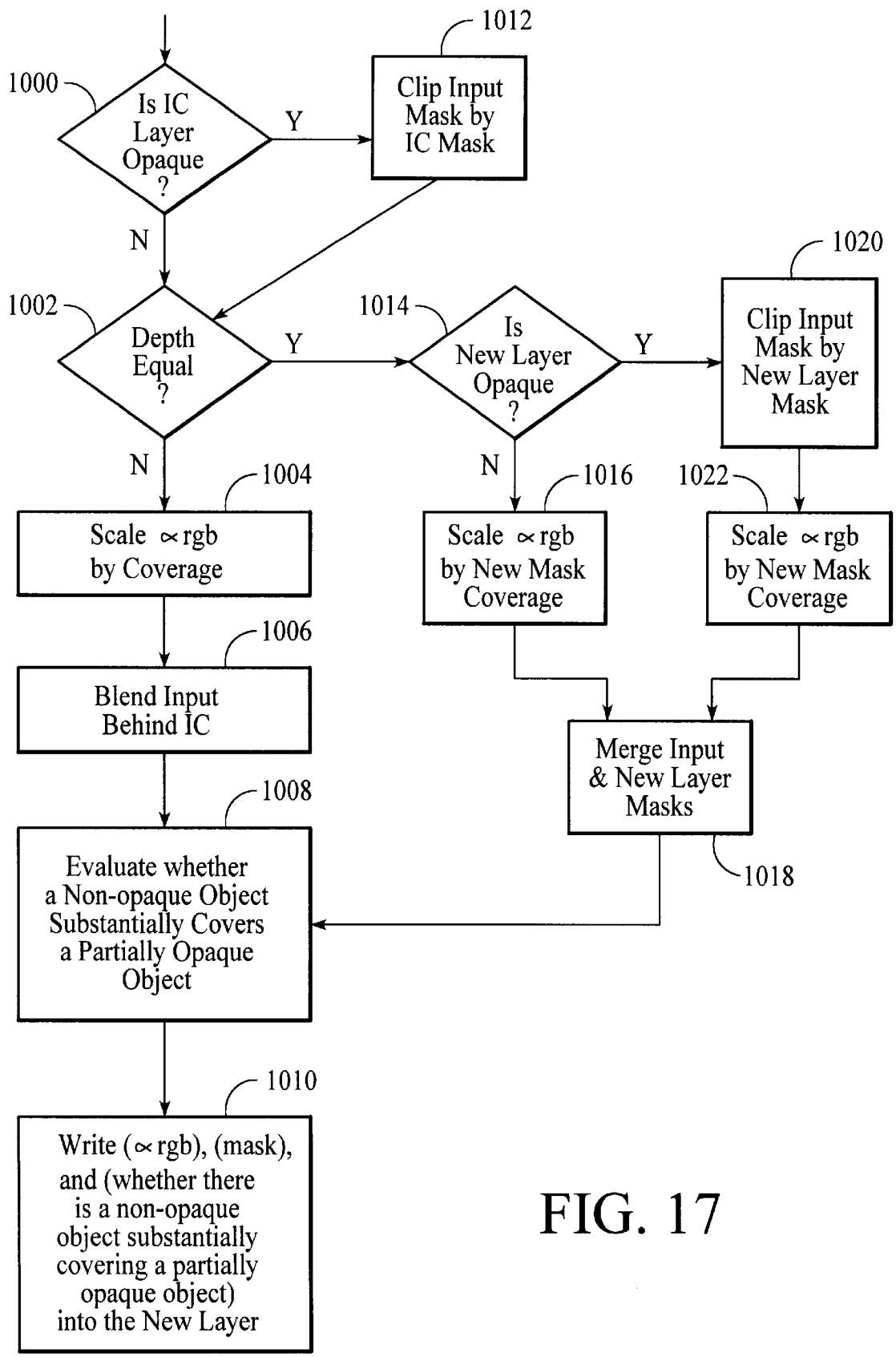
FIG. 17 is a flow diagram of the method of evaluating and antialiasing a shared vertex when multiple passes are used.

FIGS. 16 and 17 illustrate the method used in the case of a shared vertex when multiple passes are used. Here, the IC layer data is used in the compositing operation, unlike the shared vertex method illustrated in FIGS. 14 and 15 wherein the IC layer contained data for the previous partition and is typically scanned out to the image buffer in parallel with the compositing of the current partition.

FIG. 16 illustrates a non-opaque layer 900A in front of various partially opaque layers 900B–900D. The resulting image is a pixel 902 with various colors scaled by the non-opaque object 900A. An example of such an image is a view through a stained glass window looking a chair which is position on top of a rug. The chair may also be partially covering a painting on the wall behind it. In this example, the layer 900A would represent a portion of the stained glass window, the layer 900B may represent a portion of the rug, the layer 900C may represent a portion of the chair, and the layer 900D may represent a portion of the painting. The pixel 902 would represent a view through the stained glass window of an area where the rug, the chair and the painting all meet.

FIG. 17 is a flow diagram of the method of evaluating and antialiasing a shared vertex when multiple passes are necessary. The evaluation begins with determining whether the IC layer is opaque via step 1000. If it is not opaque, then it is determined whether the depths are equal via step 1002. If the depths are not equal, then the color is scaled by the coverage via step 1004. Next, the input layer is blended behind the IC layer via step 1006. In the example given, the color of the rug would be blended behind the color of the stained glass window. Then, it is evaluated whether a non-opaque object substantially completely covers a partially opaque object via step 1008. Finally, the αRGB, the mask and information regarding whether there is a non-opaque object substantially completely covering a partially opaque object is written into the new layer via step 1010.

If the IC layer is opaque in step 1000, then the input mask is clipped by the IC mask via step 1012. It is then determined whether to depths are equal via step 1002. Assuming that the depths are equal, it is then determined whether the new layer is opaque via step 1014. If the new layer is not opaque, then the color is scaled by the new mask coverage via step 1016. The input layer mask and the new layer mask are merged via step 1018. Next, it is evaluated whether a non-opaque object substantially completely covers a partially opaque object via step 1008. The αRGB, the mask, and the information regarding whether there is a non-opaque object covering a partially opaque object is then written into the new layer via step 1010.

Assuming that the new layer is opaque in step 1014, the input mask is clipped by the new layer mask via step 1020 prior to scaling the color by the coverage via step 1022. Then, the input mask and the new layer mask are merged via step 1018. It is then evaluated whether a non-opaque object substantially completely covers a partially opaque object via step 1008. Finally, the α RGB, mask, and information regarding whether there is a non-opaque object substantially completely covering a partially opaque object is written into the new layer via step 1010.

Although the present invention has been described in accordance with the embodiments shown in the figures, one of ordinary skill in the art recognizes there could be variations to the embodiments and those variations would be within the spirit and scope of the present invention. Accordingly, many modifications may be made by one of ordinary skill in the art without departing from the spirit and scope of the present invention, the scope of which is defined by the appended claims.

We claim:

1. A method for antialiasing of silouhettes and geometrics with shared vertices comprising:

controlling a blend function and hidden surface removal by using coverage data information for each pixel of an image, wherein the coverage data information comprises a coverage mask, a depth value, opacity information, and a plurality of flags for each pixel, wherein the coverage mask is provided using a plurality of buffers; and compositing the image based upon the coverage data information, wherein the compositing may occur either in a single pass or in a plurality of passes for each pixel, wherein the compositing is not performed by placing fragments and non-fragments in separate buffers, wherein for the plurality of passes, the compositing comprises:

storing in a first buffer data composited in previous passes, and storing in a second buffer a composite of the data in the first buffer and data received during a current pass.

2. The method of claim 1, wherein the plurality of flags are status flags which are evaluated for each pixel during the controlling step, comprising:

determining whether a depth of one pixel approximates the depth of another pixel; and determining whether a layer of data being evaluated is a fragment of a pixel.

3. The method of claim 1, wherein the generating of the coverage mask of the coverage data information comprises the steps of:

(a) providing a first mask in a first buffer:

(b) providing a second mask in a second buffer for a first subsequent pass of the image;

(c) determining whether a non-opaque first object substantially covers a second object;

(d) if it is determined that the non-opaque object substantially covers the second object, transferring the first mask to a frame buffer, and placing the second mask in the first buffer for use in a second subsequent pass; and (e) if it is determined that the non-opaque object substantially covers the second object, combining the first mask with the second mask to produce a third mask for use in the second subsequent pass, placing the third mask in the first buffer, and transferring the first mask to the frame buffer, wherein the steps (c) through (e) are controlled by the coverage data information.

4. A system for antialiasing an image, the image including a plurality of pixels, comprising:

means for compositing using coverage data information for each pixel of the image, wherein the coverage data information comprises a coverage mask, a depth value, opacity information, and a plurality of flags for each pixel, wherein the coverage mask is provided using a plurality of buffers;

first means coupled to the compositing means for storage of data during image compositing, wherein the compositing may occur either in a single pass or in a plurality of passes for each pixel, wherein the compositing is not performed by placing fragments and non-fragments in separate buffers, wherein for the plurality of passes, the first means stores data composited in previous passes; and a second means coupled to the compositing means and the first means, wherein for the plurality of passes, the second means stores a composite of the data in the first means and data received during a current pass.

5. A system for antialiasing an image, the image including a plurality of pixels, comprising:

an image compositor, wherein the image is composited using coverage data information for each pixel, wherein the coverage data information comprises a coverage mask, a depth value, opacity information, and a plurality of flags, wherein the coverage mask is provided using a plurality of buffers, wherein the compositing may occur either in a single pass or in a plurality of passes of each pixel;

a first buffer coupled to the image compositor, wherein the compositing is not performed by placing fragments and non-fragments in separate buffers, wherein for the plurality of passes, the first buffer stores data composited in previous passes; and a second buffer coupled to the image compositor and the first buffer, wherein for the plurality of passes, the second buffer stores a composite of the data in the first buffer and data received during a current pass.

6. The system of claim 5, wherein the plurality of flags in the compositing means are status flags which are evaluated for each pixel, comprising the determination of whether a depth of one pixel approximates the depth of another pixel, and the determination of whether a layer of data being evaluated is a fragment of a pixel.

7. The system of claim 5, wherein the generating of the coverage mask of the coverage data information comprises:

a first mask in a first buffer:

a second mask in a second buffer for a first subsequent pass of the image;

means for determining whether a non-opaque first object substantially covers a second object;

if it is determined that the non-opaque object substantially covers the second object, means for transferring the first mask to a frame buffer and for placing the second mask in the first buffer for use in a second subsequent pass; and if it is determined that the non-opaque object substantially covers the second object, means for combining the first mask with the second mask to produce a third mask for use in the second subsequent pass, for placing the third mask in the first buffer, and for transferring the first mask to the frame buffer.

8. A method for antialiasing an image, the image including a plurality of pixels, comprising the steps of:

a) providing a coverage mask for each pixel, wherein the coverage mask is provided using a plurality of buffers;

b) providing a depth value for each pixel;

c) providing opacity data for each pixel;

d) providing a plurality of flags for each pixel; and e) compositing the image using the coverage mask, depth gradient, opacity data, and plurality of flags, wherein the compositing may occur either in a single pass or in a plurality of passes for each pixel, wherein the compositing is not performed by placing fragments and non-fragments in separate buffers, wherein for the plurality of passes, the compositing comprises:

e1) storing in a first buffer data composited in previous passes, and e2) storing in a second buffer a composite of the data in the first buffer and data received during a current pass.

9. A method of mask generation for antialiasing an image on a graphics system comprising the steps of:

a) providing a first mask in a first buffer;

b) providing a second mask in a second buffer for a first subsequent pass of the image;

c) determining whether a non-opaque first object substantially covers a second object;

d) if it is determined that the non-opaque object substantially covers the second object, transferring the first mask to a frame buffer, and placing the second mask in the first buffer for use in a second subsequent pass, wherein fragments and non-fragments are not placed in separate buffers; and e) if it is determined that the non-opaque object substantially covers the second object, combining the first mask with the second mask to produce a third mask for use in the second subsequent pass, placing the third mask in the first buffer, and transferring the first mask to the frame buffer, wherein the steps (c) through (e) are controlled by coverage data information, wherein the data coverage information comprises a coverage mask, a depth value, opacity information, and a plurality of flags, wherein fragments and non-fragments are not placed in separate buffers.

10. The method of claim 9, wherein the second object is partially opaque.

11. A method of mask generation for antialiasing an image on a graphics system comprising the steps of:

(a) providing a first buffer;

(b) determining whether data is stored in the first buffer regarding a predetermined pixel;

(c) determining whether there is a first object at least partially covering a second object within the pixel, this determination being initiated in response to the data being stored in the first buffer;

(d) determining whether the first object has a depth approximately equal to a depth of the second object, this determination being initiated in response to the first object not at least partially covering the second object; and (e) replacing a first mask in a second buffer with a second mask in the first buffer for use in a subsequent pass, wherein the second mask is a mask associated with incoming data, the replacement being initiated in response to the first object having a depth which is not approximately equal to the depth of the second object, wherein steps (c) through (e) are controlled using coverage data information, wherein the coverage data information comprises a coverage mask, a depth value, opacity information, and a plurality of flags, wherein fragments and non-fragments are not placed in separate buffers.

12. The method of claim 11, further comprising step (c1) of determining if a layer of the image in the second buffer is opaque, this step being initiated in response to the first object at least partially covering the second object.

13. The method of claim 11, wherein step (d) being initiated in response to a layer of the image in a second buffer not being opaque.

14. The method of claim 11, wherein step (e) being initiated in response to a new layer not being opaque.

15. The method of claim 11, further comprising step (d1) of determining if a new layer is opaque, this step being initiated by the depths being approximately equal.

16. The method of claim 15, further comprising step (d2) of replacing the first mask with the inversion of a fourth mask, and the second mask, wherein the fourth mask is located in the first buffer, this step is initiated in response to the new layer being opaque.

17. The method of claim 11, further comprising step (c1) of clipping the second mask with the third mask, this step being initiated by a layer of the image in the second buffer being opaque.

18. The method of claim 17, further comprising step (c2) of determining if the depth of the first and second objects are approximately equal.

19. The method of claim 18, further comprising step (c3) of determining whether a new layer within the first buffer is opaque, this step being initiated by the depths being equal.

20. The method of claim 19, further comprising step (c4) of clipping the third mask by the first mask, this step being initiated by the new layer being opaque.

21. The method of claim 11, further comprising step (b1) of determining whether a non-opaque object substantially covers a partially opaque object.

22. The method of claim 21, wherein the determining step (b) further comprises step (b2) of replacing a third mask in the second buffer with a fourth mask in the first buffer, this step being initiated in response to the non-opaque object substantially covering the partially opaque object.

23. The method of claim 21, wherein the determining step (b) comprises step (b2) of determining whether the first object at least partially covers the second object, this step being initiated in response to a lack of a non-opaque object substantially covering the partially opaque object.

24. The method of claim 23, wherein the determining step (b) further comprises step (b3) of replacing a third mask located in the second buffer with the third mask bitwise ORed with a fourth mask located in the first buffer, this step being initiated in response to the first object at least partially covering the second object.

25. The method of claim 24, further comprising step (b4) of determining if a layer of the image in the second buffer is opaque.

26. A method of evaluating a silhouette for antialiasing an image on a graphics system comprising the steps of:
 (a) providing a first buffer and a second buffer;
 (b) determining that a first layer of the image is not opaque;
 (c) scaling a first color of the first layer with a coverage of the first layer;
 (d) blending the scaled color behind a first layer, the first layer being stored in the first buffer, the blending controlled by using coverage data information, wherein the coverage data information comprises a coverage mask, a depth value, opacity information, and a plurality of flags;
 (e) noting that a non-opaque object in front substantially covers a partially opaque object;
 (f) writing the blended data into the second buffer, wherein fragments and non-fragments are not placed in separate buffers; and
 (g) transferring the blended data into the first buffer for use in subsequent passes.

27. A method of evaluation a silhouette for antialiasing an image on a graphics system comprising the steps of:
 (a) providing a first buffer and a second buffer;
 (b) determining that a first layer of the image in the first buffer is opaque;
 (c) clipping a second layer mask with a first layer mask;
 (d) scaling a second color of the second layer with a coverage of the second layer mask;
 (e) blending the clipped mask and the scaled color with contents of the first buffer, the blending controlled by using coverage data information, wherein the coverage data information comprises a coverage mask, a depth value, opacity information, and a plurality of flags;
 (f) writing the blended data into the second buffer, wherein fragments and non-fragments are not placed in separate buffers; and
 (g) transferring the blended data into the first buffer for use in subsequent passes.

28. A method of evaluating a shared vertex for antialiasing an image on a graphics system comprising the steps of:
 a) providing a first buffer;
 b) providing a first layer of the image in the first buffer having a first depth;
 c) providing a second layer having a second depth, a second color, a second mask, and a coverage value;
 d) determining whether the first depth is approximately equal to the second depth;
 e) scaling the second color by the coverage value, the scaling being initiated in response to the depths not being approximately equal;
 f) writing data into a second buffer, the writing being initiated in response to the depths not being approximately equal, wherein the data comprises the scaled color, the second mask, and data indicating whether there is a non-opaque object substantially covering a partially opaque object, wherein fragments and non-fragments are not placed in separate buffers; and
 (g) transferring the blended data into the first buffer for use in subsequent passes.

29. The method of claim 28, further comprising step (d1) of determining whether a new layer is opaque, the new layer being selected from one of the first and second layers, this step being initiated in response to the depths not being approximately equal.

30. The method of claim 29, wherein the buffer has a first mask, further comprising step (d2) of clipping the second mask by the first mask, the clipping being initiated in response to the first layer being opaque.

31. The method of claim 29, further comprising step (d2) of scaling the color of the second layer by the coverage value.

32. The method of claim 31, further comprising step (d3) of determining whether the second layer is a fragment.

33. The method of claim 32, wherein the buffer has a first color, further comprising step (d4) of adding the first color and the second color, the adding being initiated in response to the second layer being a fragment.

34. The method of claim 33, wherein the buffer has a first mask, further comprising step (d5) of merging the first mask with the second mask, the merging being initiated in response to the second layer being a fragment.

35. The method of claim 34, further comprising step (d6) of writing the added color and merged masks into the buffer.

36. The method of claim 32, wherein the buffer has a first color, further comprising step (d4) of blending the second color behind the first color, the blending being initiated in response to the second layer not being fragment.

37. The method of claim 36, wherein the buffer has a first mask, further comprising step (d5) of merging the first mask and the second mask, the merging being initiated in response to the second layer not being a fragment.

38. The method of claim 37, further comprising step (d6) of writing the blended color and merged masks into the buffer.

39. A method for evaluating a shared vertex for antialiasing an image in a graphics system comprising the steps of:
 a) providing a first buffer;
 b) providing a second buffer having a first layer of the image with a first depth;
 c) providing a second layer of the image with a second depth;
 d) determining whether the first layer is opaque;
 e) determining whether the first depth is approximately equal to the second depth;
 f) evaluating whether a non-opaque object substantially covers a partially opaque object; and
 g) writing data into the first buffer, wherein the data comprises a first color, a first mask, and information regarding whether there is a non-opaque object substantially completely covering a partially opaque object, wherein fragments and non-fragments are not placed in separate buffers.

40. The method of claim 39, wherein the first layer has a second mask and the second layer has a third mask, and wherein the determining step d) further comprises step (d1) of clipping the third mask with the second mask, the clipping being in response to the first layer being opaque.

41. The method of claim 39, wherein the second layer includes a second color and a coverage, and wherein between the determining step e) and the evaluating step f) comprises step (e1) of scaling the second color with the coverage.

42. The method of claim 41 further comprising step (e2) of blending the second layer behind the first layer, wherein the blending being initiated by the depths not being equal.

43. The method of claim 39, wherein between the determining step e) and the evaluating step f) comprises step (e1) of determining whether a third layer of the image is opaque, wherein the third layer is located in the first buffer, this determination being initiated in response to the depths being equal.

44. The method of claim 43, wherein the third layer includes a coverage and a color, wherein between the determining step e) and the evaluating step f) further comprises step (e2) of scaling the color of the third layer by the coverage, the scaling being initiated in response to the third layer not being opaque.

45. The method of claim 44, wherein the second layer includes a first mask and the first buffer includes a second mask, wherein between the determining step e) and the evaluating step f) further comprises step (e3) of merging the first and second masks.

46. The method of claim 43, wherein the second layer includes a first mask and a first buffer includes a second mask, wherein between the determining step e) and the evaluating step f) further comprises step (e2) of clipping the first mask by the second mask, the clipping being initiated in response to the third layer being opaque.

47. The method of claim 46, wherein the clipping facilitates a production of a coverage, further comprising step (e3) of scaling the color of the third layer by the coverage.

48. The method of claim 47, wherein the second layer includes a first mask and the first buffer includes a second mask, further comprising step (e4) of merging the first and second masks.

49. A computer-readable medium containing program instructions for antialiasing an image, the image including a plurality of pixels, comprising:
   a) providing a coverage mask for each pixel, wherein the coverage mask is provided using a plurality of buffers;
   b) providing a depth value for each pixel;
   c) providing opacity data for each pixel;
   d) providing a plurality of flags for each pixel; and
   e) compositing the image using the coverage mask, depth value, opacity date, and plurality of flags, wherein the compositing may occur either in a single pass or in a plurality of passes for each pixel, wherein the compositing is not performed by placing fragments and non-fragments in separate buffers, wherein for the plurality of passes, the compositing comprises:
      e1) storing in a first buffer data composited in previous passes, and
      e2) storing in a second buffer a composite of the data in the first buffer and data received during a current pass.

50. A method for antialiasing of silouhettes and geometrics with shared vertices comprising the steps of:
   (a) controlling a blend function and hidden surface removal by using coverage data information for each pixel of an image, wherein the coverage data information comprises a coverage mask, a depth value, opacity information, and a plurality of flags for each pixel, wherein the providing of the coverage mask comprises the steps of:
      (a1) providing a first mask in a first buffer:
      (a2) providing a second mask in a second buffer for a first subsequent pass of the image;
      (a3) determining whether a non-opaque first object substantially covers a second object;
      (a4) if it is determined that the non-opaque object substantially covers the second object, transferring the first mask to a frame buffer, and placing the second mask in the first buffer for use in a second subsequent pass; and
      (a5) if it is determined that the non-opaque object substantially covers the second object, combining the first mask with the second mask to produce a third mask for use in the second subsequent pass, placing the third mask in the first buffer, and transferring the first mask to the frame buffer; and
   (b) compositing the image based upon the coverage data information, wherein the compositing may occur either in a single pass or in a plurality passes for each pixel, wherein the compositing is not performed by placing fragments and non-fragments in separate buffers.

51. A system for antialiasing an image, the image including a plurality of pixels, comprising:
   an image compositor, wherein the image is composited using coverage data information for each pixel, wherein the coverage data information comprises a coverage mask, a depth value, opacity information, and a plurality of flags, wherein the providing of the coverage mask comprises:
      a first mask in a first buffer;
      a second mask in a second buffer for a first subsequent pass of the image;
      means for determining whether a non-opaque first object substantially covers a second object;
      if it is determined that the non-opaque object substantially covers the second object, means for transferring the first mask to a frame buffer and for placing the second mask in the first buffer for use in a second subsequent pass; and
      if it is determined that the non-opaque object substantially covers the second object, means for combining the first mask with the second mask to produce a third mask for use in the second subsequent pass, for placing the third mask in the first buffer, and for transferring the first mask to the frame buffer; and
   the first buffer coupled to the image compositor, wherein the first buffer stores data during image compositing, wherein the compositing is not performed by placing fragments and non-fragments in separate buffers.

* * * * *